United States Patent
Antheunes et al.

(10) Patent No.: US 6,459,219 B1
(45) Date of Patent: Oct. 1, 2002

(54) HORIZONTAL DEFLECTION CIRCUIT WITH DYNAMIC S-CORRECTION

(75) Inventors: Ferdinand R. Antheunes; Christianus H. J. Bergmans, both of Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/856,929
(22) PCT Filed: Sep. 25, 2000
(86) PCT No.: PCT/EP00/09386
§ 371 (c)(1), (2), (4) Date: May 30, 2001
(87) PCT Pub. No.: WO01/26360
PCT Pub. Date: Apr. 12, 2001

(30) Foreign Application Priority Data

Oct. 1, 1999 (EP) .............. 99203206
Aug. 7, 2000 (EP) .............. 00202789

(51) Int. Cl.$^7$ ................................. G09G 1/04
(52) U.S. Cl. ........... 315/370; 315/368.21; 315/399; 315/366
(58) Field of Search .................. 315/370, 371, 315/369, 364, 368.21, 382.1, 399, 400, 408, 366

(56) References Cited

U.S. PATENT DOCUMENTS

| | | | |
|---|---|---|---|
| 4,590,436 A | 5/1986 | Butler et al. | 330/277 |
| 5,949,201 A | 9/1999 | Suzuki et al. | 315/370 |
| 6,060,846 A * | 5/2000 | Bergmans et al. | 315/371 |
| 6,218,791 B1 * | 4/2001 | Teuling et al. | 315/408 |

FOREIGN PATENT DOCUMENTS

EP 0823812 A2 2/1998

* cited by examiner

Primary Examiner—Don Wong
Assistant Examiner—Tuyet T. Vo
(74) Attorney, Agent, or Firm—Steven R. Biren

(57) ABSTRACT

A simple and cheap dynamic S-correction circuit compensates the higher order errors like the so-called moustache effect and the inner linearity distortion. This is achieved in a known way by connecting an additional proper tuned S-capacitor in parallel with the original one during the start and end of the scan interval. Duty cycle modulation of the on/off times as a function of the frame compensates the inner-pin distortion (also called inner-linearity or modulated S-correction). The duty cycle or the switch on and off instants required to compensate the horizontal distortion or moustache effect is derived by comparing the AC parabolic waveform generated on the S-capacitors with a DC-voltage. Duty-cycle modulation required for compensation of the inner-pin distortion is, in this way, automatically obtained.

21 Claims, 3 Drawing Sheets

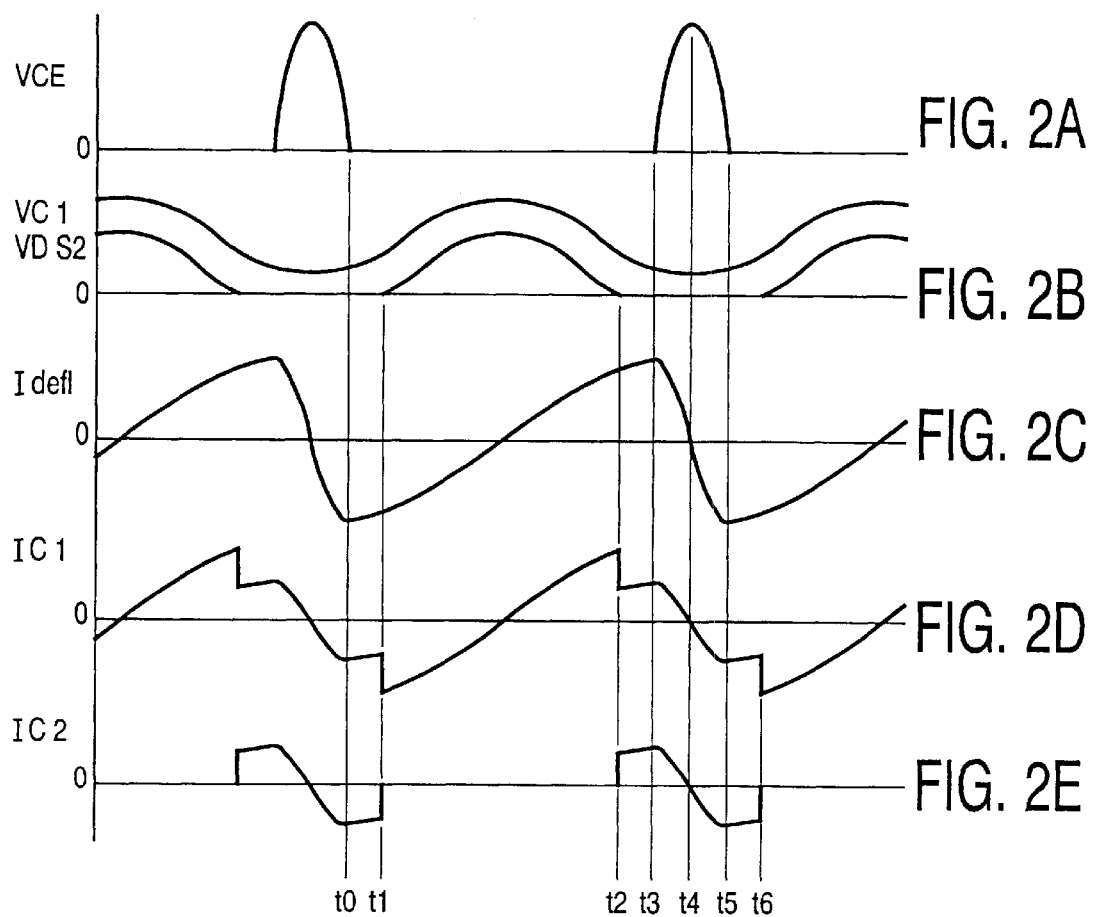
FIG. 2A
FIG. 2B
FIG. 2C
FIG. 2D
FIG. 2E
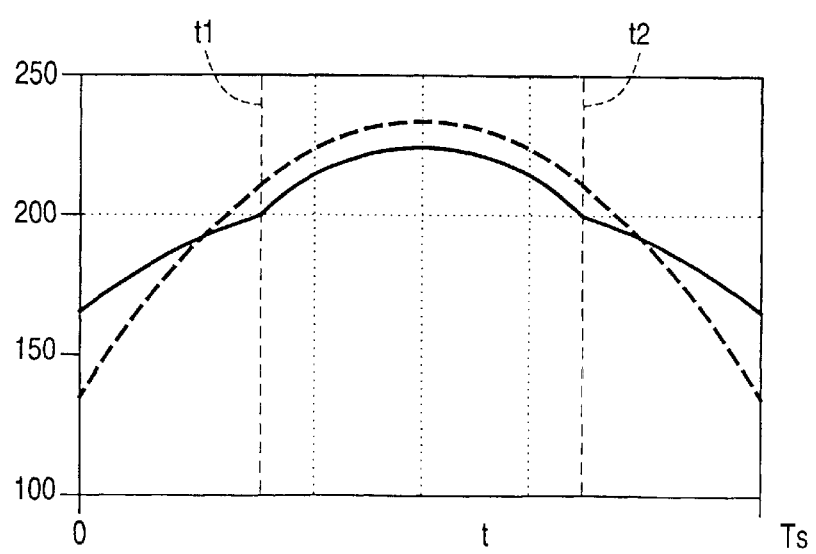
FIG. 3

HORIZONTAL DEFLECTION CIRCUIT WITH DYNAMIC S-CORRECTION

BACKGROUND OF THE INVENTION

This invention relates to a line deflection circuit with a dynamic S-correction circuit, a dynamic S-correction circuit, and a display apparatus comprising such a dynamic S-correction circuit.

Flatter and shallower picture tubes, (election tubes, cathode ray tubes) are showing a strong increase of geometric errors like especially the so-called moustache effect and inner-pin. The moustache effect is a geometric error where the cross-hatch width at the start and end of the picture is much smaller compared to the middle. Compensating these increased higher order errors is difficult and almost impossible to realize with conventional circuits. Methods like, high frequent modulating the deflection current, or inserting e.g. controlled and regulated saturable inductors in series with the yoke are complex, expensive and dissipative.

The moustache effect as well as the inner pin distortion can be overcome by adapting the value of the S-capacitor during a certain interval of the scan time. In this way an improved S-shaped deflection current can be realized, and the above mentioned higher order errors can be compensated for any picture tube.

Most picture tubes suffer from the so-called "Moustache effect". This is a geometric error visible as a compression of the picture displayed on the screen of the picture tube at the begin and end of the screen compared to the middle of the screen. Adaptation of the value of the S-capacitor during a certain time interval of the scanning interval is a known method to compensate this error. The inner-pin distortion can be compensated at the same time by modulating this time interval as a function of a frame frequent correction waveform.

U.S. Pat. No. 5,949,201 discloses a deflection circuit which has a first S-correction capacitor in series with a line deflection coil. A second S-correction capacitor is connected in parallel with the first S-correction capacitor via a MOS-FET during the left-hand and the right-hand ends of the screen. Sawtooth generator circuits and comparator circuits control the on-periods of the MOS-FET to vary in the vertical direction such that an amount of intermediate pin distortion (usually referred to as inner-pin distortion) is sufficiently corrected. A high voltage capacitive divider is required to supply an input signal to the sawtooth generators. Consequently, this prior art dynamic S-correction circuit is quite complex. Further, the capacitive divider is expensive.

SUMMARY OF THE INVENTION

It is, inter alia, an object of the invention to provide a line deflection circuit with a dynamic S-correction circuit which corrects the inner pin distortion and which is less complex.

To this end, a first aspect of the invention provides a deflection circuit with a dynamic S-correction circuit including a control circuit operative with a voltage comprising a DC and an AC component. A second aspect of the invention provides a dynamic S-correction circuit including the aforesaid control circuit. Advantageous embodiments are defined in the dependent claims. A third aspect of the invention provides a display apparatus including the aforesaid dynamic S-correction circuit.

The line deflection circuit in accordance with the invention comprises a first S-correction capacitor arranged in series with the line deflection coil. A substantially sawtooth shaped deflection current through the line deflection coil causes a substantially parabola shaped voltage across the first S-correction capacitor. This substantially parabola shaped voltage comprises a DC-component and an AC-component. A dynamic S-correction circuit comprises an arrangement of a switch and a second S-correction capacitor. In one of the states of the switch, the total S-capacitance is determined by both a value of the first and the second S-capacitor. In the other state of the switch, the total S-capacitance is determined by the value of the first S-capacitor only. A comparator controls an instant of switching of the switch by comparing the substantially parabola-shaped voltage across the first S-correction capacitor with a reference level.

As in a line deflection circuit the amplitude of the line deflection current will vary in the vertical direction in accordance with the East-West modulation to correct the pin distortion, the substantially parabola-shaped voltage varies in the vertical direction. Consequently, the comparator, which compares this varying substantially parabola-shaped voltage with the reference level, automatically adapts the switching instant of the switch to correct the inner pin distortion.

EP-A-0 823 812 discloses a horizontal S-shape correction circuit. The turn-off period of the FET is adjusted by changing the output pulse width of the driver circuit of the FET according to the horizontal deflection frequency, to adjust the total capacitance value of the S-shape correcting capacitor group in one horizontal deflection period, that is, to execute an optimum S-shape distortion correction according to each horizontal deflection frequency. The timing at which the electronic switch element is turned off in a first half of the horizontal scanning period is continuously and variably controlled on the basis of an external control signal (Vg). The auxiliary S-shape correcting capacitor of the S-shape correcting capacitor group is controllably turned on or off by the electronic switch element, to execute an optimum S-shape distortion correction.

FIG. 14 of this prior art shows a detecting circuit (referred to as 208) generating a DC-level (referred to as Epb) indicating an amplitude of the voltage across the S-correction capacitor (referred as 7). A comparator (referred to as 209) compares this DC-level with a reference level. In this way, an optimal S-correction is obtained at different horizontal deflection frequencies. The circuit of the prior art does not compare a combination of the DC- and the AC-component of the voltage across the S-correction capacitor with the reference. This prior art circuit does not correct the inner-pin distortion, but the S-shape (thus the pin distortion) as a modulation of the S-shape is not disclosed.

The practical implementation of the circuits improving the horizontal linearity and the inner-pin is different and much simpler than the methods published in the prior art cited above. The required modulation of the On and Off periods or the δ-cycle as a function of the frame to compensate the inner pin distortion are obtained by using the parabolic waveform across the S-capacitors. This parabolic waveform is modulated by the East-West information (in a usual TV application) or B+modulation (the modulation of the power supply voltage of the line deflection circuit in a usual monitor application). So, the δ-cycle will be modulated by the same low frequent East-West information and to produce the correct inner-pin correction.

This method gives the desired corrections, independent of the scan frequency over a relatively large range.

An embodiment of the invention, in which the dynamic S-correction circuit has only two terminals connected across the first S-correction capacitor, is based on the insight that the voltage across the first (also referred to as main) S-capacitor contains all of the information required to determine the ON and OFF instants of the switch. This has the practical advantage that the drive circuit is fully self-supporting. In other words, the drive circuit receives the parabolic waveform across the main S-capacitor to generate, without other interfaces or power supplies, the ON and OFF times (or δ cycle) for the switch so as to compensate the horizontal linearity or moustache effect, and the required modulation of this δ-cycle as a function of the frame position to compensate the inner-pin distortion. Consequently, this manner of geometry correction can, for TV applications, be assembled on the yoke and optimized as a unit together with the picture tube.

Both the embodiment as defined in claim 3, and the embodiment as defined in claim 4 have the advantage that the amount of the AC component fed to the comparator is selectable for influencing the switching instants of the switch to obtain an optimal performance for the inner-pin distortion correction.

These and other aspects of the invention will be apparent from and elucidated with reference to the embodiments described hereinafter.

In the drawings:

FIG. 1 shows a basic line deflection circuit with a dynamic S-correction circuit, FIG. 2 shows waveforms of signals occurring in the circuit of FIG. 1, FIG. 3 shows the voltage across the S-correction capacitor in detail, FIG. 4 shows a basic block diagram of a dynamic S-correction circuit in accordance with an embodiment of the invention, and FIG. 5 shows a detailed circuit diagram of a line deflection circuit and of a dynamic S-correction circuit in accordance with an embodiment of the invention.

DESCRIPTION OF THE PREFERRED EMBODIMENTS

FIG. 1 shows a basic line deflection circuit with a dynamic S-correction circuit. In a line deflection circuit, a line deflection current Idefl is generated which flows through a line deflection coil L1 to deflect an electron beam in a cathode ray tube CRT. A main switch T1 is coupled to the deflection coil L1 to generate a substantially sawtooth shaped line deflection current Idefl in the line deflection coil L1. An S-capacitor C1 is coupled to the deflection coil L1 to subtract a parabola shaped voltage from the substantial DC voltage across the line deflection coil such that an S shaped line deflection current Idefl is obtained. Consequently, the rate of deflection is higher in the middle of the CRT screen than at the edges to compensate for a flat screen of the picture tube. Adapting the value of the S-capacitor during a predetermined interval of the scan period can compensate both higher order horizontal linearity distortions and inner-pin distortion. In an embodiment as shown in FIG. 1, an additional S-capacitor C2 is switched in parallel with the main S-capacitor C1 during the start and end of the scan period. Modulation of the on-periods of the switch S2, as a function of the frame position, compensates the inner-pin distortion.

The switch S2 is turned off during a predetermined period in time (the period in time between t1 and t2 in FIG. 2) centered around the middle of the scan period. The shape of the deflection current Idefl is during this period in time determined by the fixed capacitor C1 only. Outside this period in time, the shape of the deflection current Idefl is determined by the parallel arrangement of both the main S-capacitor C1 and the additional S-capacitor C2.

The line deflection circuit further comprises a diode D1 and a flyback capacitor Cf arranged in parallel with the main current path of the switch T1. The components and their operation are well known from prior art line deflection circuits.

The diode D2 which is arranged in parallel with the switch T2 may be the internal diode of a MOS-FET when T2 is a MOS-FET.

FIG. 2 shows waveforms of signals occurring in the circuit of FIG. 1.

FIG. 2A shows the voltage VCE across the collector-emitter path of the switch T1.

FIG. 2B shows the voltage VC1 across the S-capacitor C1, and the voltage VDS2 across the drain-source path of the switch T2.

FIG. 2C shows the deflection current Idefl through the deflection coil L1.

FIG. 2D shows the current IC1 through the S-capacitor C1, and

FIG. 2E shows the current through the additional S-capacitor C2.

Figure 1:
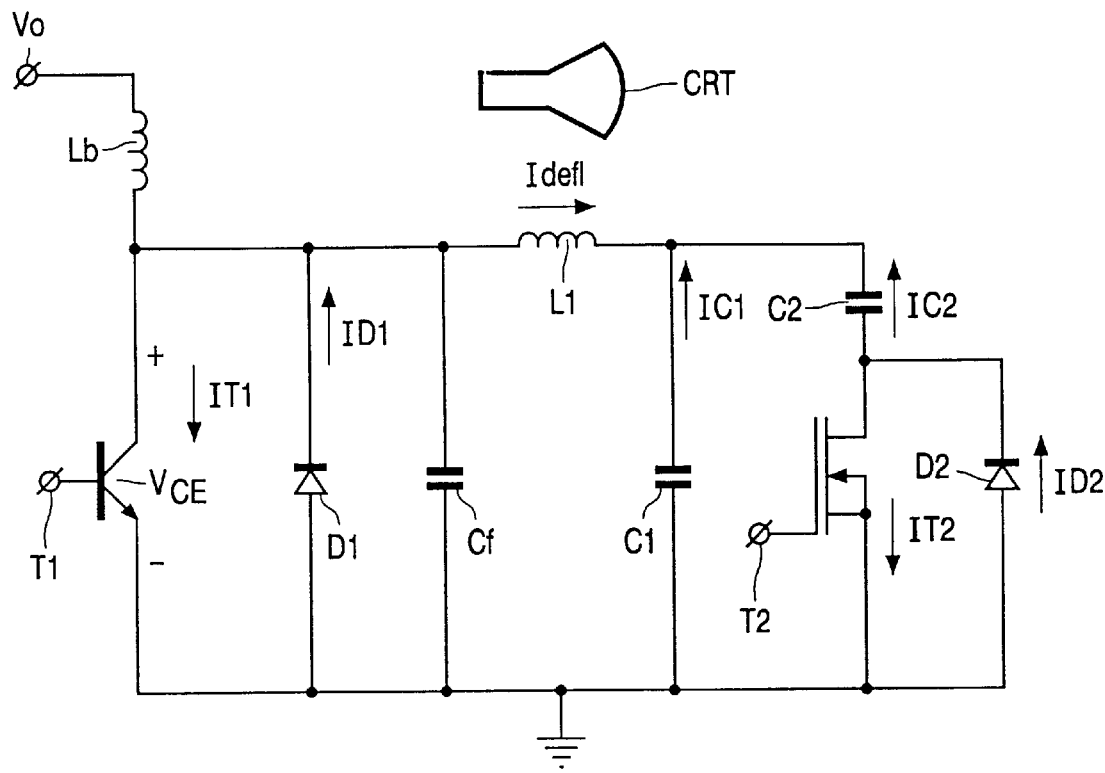

The operation of the circuit of FIG. 1 will now be elucidated with respect to the waveforms of FIGS. 2.

In state 1, during the time from the instant t1 to t2, the switch T2 is not conductive. The waveform of the deflection current is determined during this state by the fixed capacitor C1 only.

In state 2, during the time from the instant t2 to t6, the switch T2 is conductive. Thus, the switch T2 (which may be a MOS-FET T2 with an internal body diode D2) is conductive during the first and last part of the scan time (t0 to t3) as well as during the complete flyback time (t3 to t5, t4 is the center of the flyback period). During this interval the total deflection current is divided into a part through C1 (IC1) and a part through C2 (IC2).

The internal body diode D2 starts to be conductive in an automatic way as soon as the voltage VDS2 tends to be negative. As a result of this the switch-on and off instants of the capacitor C2 are, by balance of voltage equilibrium, always symmetrical around the middle of the scan period. This symmetrical phenomena implies that, it is basically sufficient to switch-off the MOS-FET T2 not later than at the instant t1, and that this method is only able to correct symmetrical linearity distortions around the middle of the scan interval time. Thus, asymmetrical distortions, for example the influence of the yoke resistance can not be compensated in this way.

FIG. 3 shows the voltage across the S-correction capacitor in detail. FIG. 3 shows as a dashed curve, the voltage across the capacitor C1 when the dynamic S-capacitor switching circuit is absent, the other curve shows the corrected S-capacitor waveform when the dynamic S-capacitor switching circuit is operative. The switch T2 is switched-off during, the scan interval period t1<t<t2 of the scan period 0 to Ts. The switch T2 is switched on during the rest of the scan period.

The switching instants t1 and t2 (see FIGS. 2 and 3) are positioned symmetrically around the middle of the scan time.

It is evident that the shape of the voltage across the S-capacitor remains constant in both cases in the middle of the scan and thus also the shape of the deflection current. However, the deflection current is more linear outside this interval. No scan velocity modulation will be seen on the screen during the take over points at the instants t1 and t2 because the shape or derivative of the deflection current remains constant as a result of the continuity caused by the inductance of the deflection coil L1.

Figure 4:
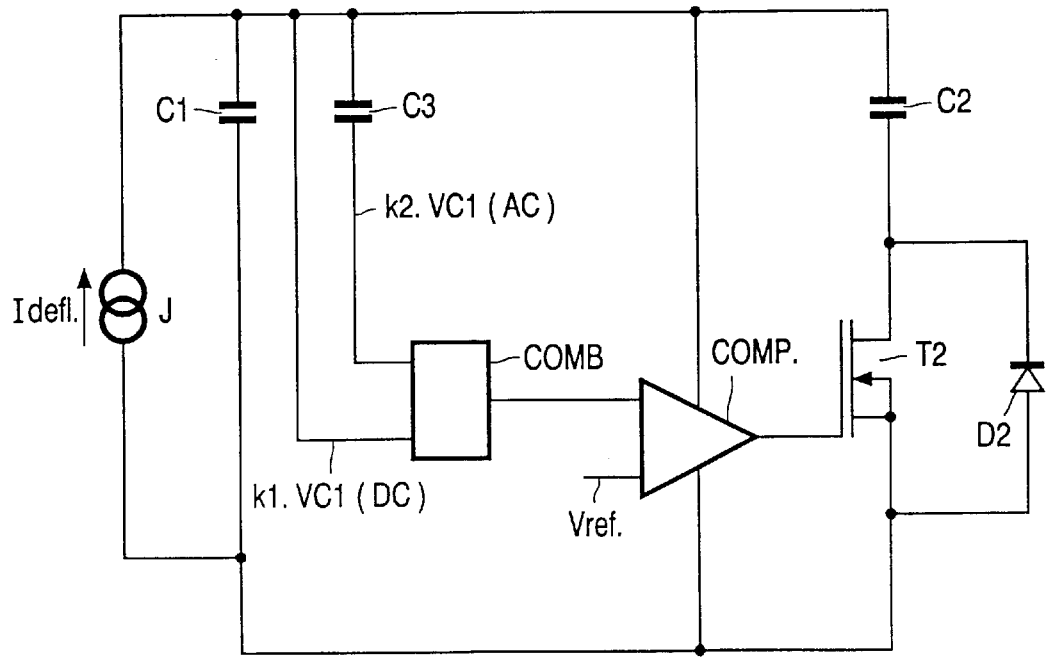

FIG. 4 shows a basic block diagram of a dynamic S-correction circuit in accordance with an embodiment of the invention.

A current source J is arranged in parallel with the main S-correction capacitor C1 to supply the deflection current Idefl to the capacitor C1. The current source J represents one of many possible line deflection circuits. A circuit COMB comprises a first input to receive the voltage on the capacitor C1 (having a DC- and an AC-component) and a second input to receive the voltage on the capacitor C1 via a capacitor C3 (the AC-component only) to supply an input signal to a first input of the comparator COMP. The input signal may be equal to the voltage on the capacitor C1 (the capacitor C3 has a very small value, or is not present), or may be the voltage on the capacitor C1 of which the amount of the AC-component is increased by adding the AC-component obtained via the capacitor C3 to the voltage on the capacitor C1. The input signal may be the voltage on the capacitor C1 of which the amount of the AC-component is decreased by subtracting the AC-component obtained via the capacitor C3 to the voltage on the capacitor C1. The comparator has a further input receiving a reference level Vref to supply a switching signal to the switch T2.

A perfect horizontal linearity, valid for each picture tube, can only be realized by a continuous adaptation of the deflection current during the horizontal scan. Creating a more linear deflection current during begin and end of the scan time can be realized by increasing the value of the S-capacitor during these scan interval times. As known from the prior art, this is in practice realized by switching a second S-capacitor C2 in parallel with a fixed one C1 during a proper scan interval time or duty cycle. In this way the following advantages are offered with a minimum of energy losses: a compensation of the so called "moustache effect" while, the inner linearity can be fully compensated all over a complete picture by modulating the duty cycle as a function of a frame period.

The invention is concerned with a dynamic S-correction circuit for controlling the on- and off-times of the switch T2 such that the linearity correction obtained is correct even when the amount of east west correction required changes. In contrast to the prior art, this is achieved with a simple circuit. Further, no supply voltages are required for this dynamic S-correction circuit. The dynamic S-correction circuit can easily be implemented as an optional add-on by replacing the original S-capacitor on the main board with the circuit on the right hand side of C1 including C1.

The deflection current Idefl generates a substantial parabola or AC waveform across the capacitor C1. This AC waveform is superposed on the supply voltage (a DC-component) of the line deflection circuit. The amplitude of the deflection current Idefl is, in TV applications, modulated by the East-West generator as a function of the frame position. In this way, the amplitude of the AC-waveform across the capacitor C1 is modulated as a function of the frame position as well. A comparator Comp compares the voltage across the capacitor C1 with a reference voltage Vref, and supplies a switching signal to the switch T2 for switching on and off the mosfet T2 in response to this comparison. In an embodiment, the mosfet T2 is switched on when the voltage across the capacitor C1 drops below the reference voltage Vref during the second halve of the scan period. The diode D2 will become conductive during the first halve of the scan period automatically at the correct instant due to the symmetrical voltage across the S-capacitor C1. As the voltage across the S-capacitor C1 consists of a DC and an AC component, denoted with VC1(DC) and VC1(AC), respectively, $\delta$ is a function of the VC1 (AC)+ VC1 (DC), wherein the East-West generator modulates the AC part and thus modulates the $\delta$, which is required to compensate the inner pin error, as well. In a preferred embodiment, the ratio of the AC-component VC1(AC) and the DC-component VC1(DC) is adjustable to obtain a perfect compensation for the inner-pin distortion. A circuit COMB combines the AC- and the DC-component into an input signal for the comparator COMP.

Inner-pin modulation only can be achieved with a simple diode-modulator. This implies a much easier tunable output stage with one inductor less, compared to the diode-modulator with dynamic inner-pin correction.

The invention is based on the insight that the voltage across the main S-capacitor C1 contains all of the information required to determine the ON and OFF instants of the switch S2 (as shown in FIG. 1) or the mosfet T2 (as shown in FIG. 4) with its internal body diode D2.

Figure 5:
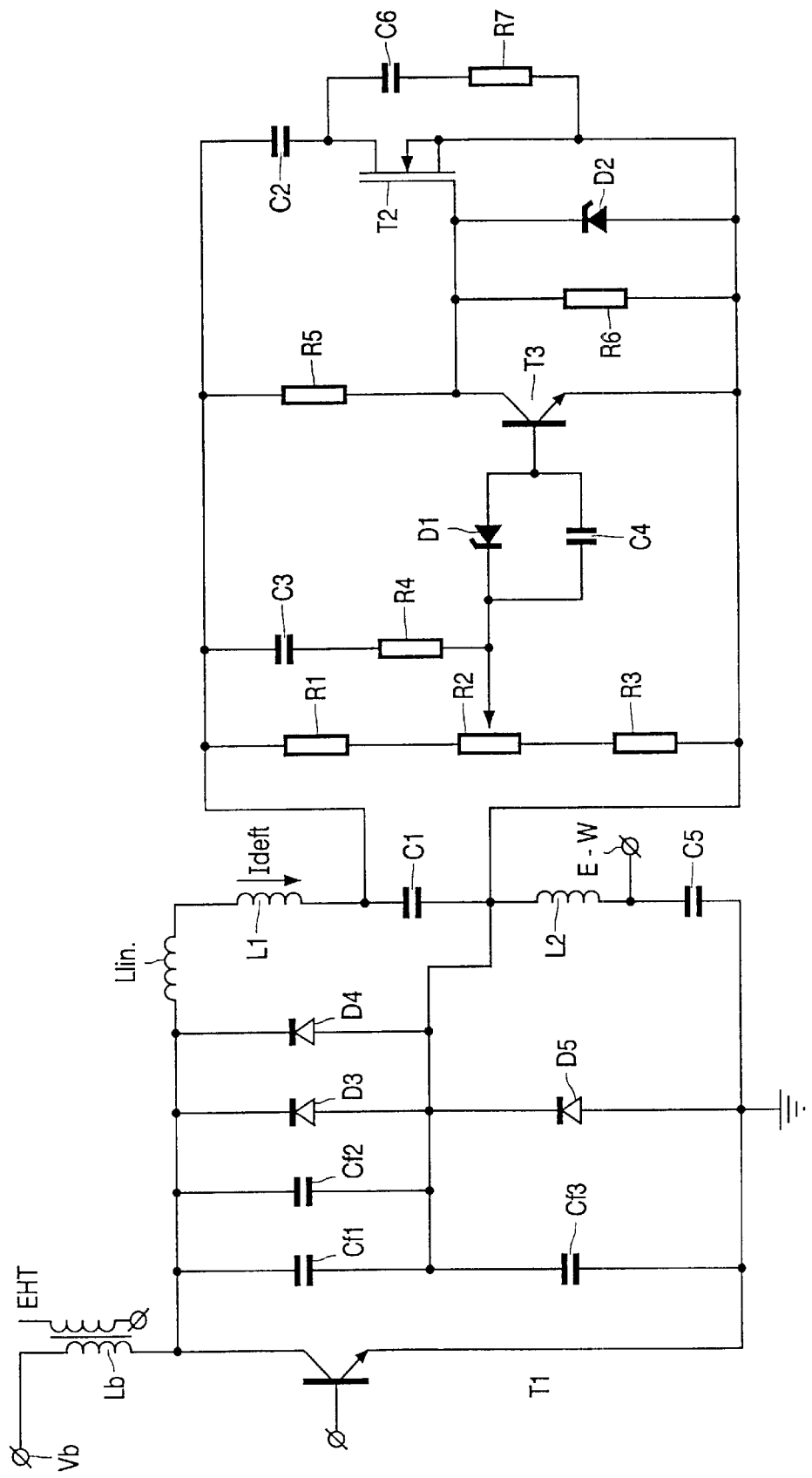

FIG. 5 shows a detailed circuit diagram of a line deflection circuit and of a dynamic S-correction circuit in accordance with an embodiment of the invention.

A basic diagram of a known line deflection circuit (TI, Lb, L1, C1, L2, C5) with a dynamic S-capacitor switching circuit (C2, T2, D2) in accordance with an embodiment of the invention is shown in FIG. 5. This deflection circuit generates a parabola waveform across the (main S-) capacitor C1 and an average DC-voltage of Vb−V(East West). Vb is the power supply voltage of the line deflection circuit, V(East West) is a frame frequency correction waveform supplied to the junction of the coil L2 and the capacitor C5. In the additional dynamic switching circuit, the following blocks are present:

1. The extra S-capacitor C2, which is switched in parallel with the capacitor C1 during the beginning and end of the scan period by the switch T2 (which is a MOS-FET including an internal body diode).

2. A $\delta$-cycle modulator controlled by a discrete comparator (the zener diode D1, and the transistor T3) which compares the voltage across the capacitor C1 with a voltage across the zenerdiode D1 acting as reference voltage.

3. The input circuitry (the resistors R1 to R4 and the capacitor C3) preceding the comparator, to compensate both linearity distortions. The resistors R1, R2 and R3 tap the voltage VC1 across the capacitor C1 to obtain a tapped-in voltage k1*VC1. The capacitor C3 and the resistor R4 add to this tapped-in voltage k1*VC1 an tapped-in AC-component k2.VCI(AC). In this way, if required, the AC-component in the voltage to be compared can be enlarged to improve the performance of the circuit.

The width of a complete picture (for example a Crosshatch) is kept constant by the East-West generator by modulating the amplitude of the deflection current Idefl as a function of the frame position. As a result of this, the AC-component of the voltage across the capacitor C1 and thus the $\delta$ of the $\delta$-cycle modulator is modulated as well. With the modulation of the On- and Off-periods of the switch S2 caused by the East-West generator it is possible to optimize the horizontal distortion (moustache effect) as well as the inner-pin correction over a large range of picture tubes by matching the resistors R1 to R4 properly. Without the components C3 and R4, a minimum amount of inner pin compensation is obtained. If a larger amount of inner pin compensation is required, the contribution of the frame parabola has to be enlarged. In a possible embodiment, this is obtained by implementing the components C3 and R4. In case less or no inner-pin compensation is required, the contribution of the frame parabola has to be decreased or eliminated. In one embodiment, the frame parabola obtained by the components C3 and R4 is inverted, for example by an opamp before it is combined with the voltage obtained via the divider R1, R2, R3. In another embodiment, a peak value of the voltage across the capacitor C1 is measured and added with the correct polarity.

The ON and OFF times of the additional switch T2 are provided by comparing the tapped parabolic waveform on the S-correction capacitor C1 with a DC-voltage which in a practical implementation may be selected to be 4.7V. In this way the MOS-FET T2 (+internal body diode) is driven into conduction at the start and end of the scan time. The AC parabolic voltage is enlarged by the components C3 and R4.

All the inputs of this additional circuit are derived from the waveform generated across C1 only. This circuit is fully self-supporting because of the lack of other supply voltages and/or interfaces, while it provides all the needed correction levels, because the parabolic waveform across the S-capacitors generates the ON and OFF times of the switch S2, and it creates at the same time the correct duty-cycle modulation of these switching times as a function of the frame position. Indeed, the line frequency parabolic waveform and thus the ON/OFF times of the switch S2 are modulated by the East-West generator as a function of the frame position. In this way the inner-pin distortion is automatically compensated.

Switching the capacitor C2 in parallel with C1 during the proper scan interval by means of an N-type of mosfet is the cheapest and simplest method since the diode D2 automatically becomes conductive. In other words, the initial on-time of S2 is not critical as long as S2 is conductive before the second half of the flyback time. This in contrast to a P-type of switch with its drain connected to ground.

The opposite compensation effect, whereby the extra capacitor C2 is switched in parallel with C1 in the middle of the scan and switched off at the begin and end of the scan time, may be realized by inserting a P_type mosfet as switch S2 with its source connected to ground. This method is for the present picture tubes rather unpractical. It is also possible to influence the total S-capacitance value by shortening an extra S-capacitor in series with the main S-capacitor.

The table below lists the values of the most relevant components in the deflection circuit shown in FIG. 5 for a 32" real flat tube operating at 32 kHz line frequency and 100 Hz frame frequency as used in TV applications. However the same principle will work for other tubes and/or other applications as well.

| Key component description | Reference | value | type number |
|---|---|---|---|
| Picture tube 32" real flat | | | W76ERF031X044 |
| Deflection Yoke | L1 | 0.3 mH | |
| Linearity coil | L1in | | AT4042/32A |
| Bridge coil | L2 | 0.25 mH | AT4043/78 |
| Bridge capacitor | C5 | 1 uF | |
| Line deflection transistor | T1 | | BU2525AF |
| Switch T2 | T2 | | BUX474/400 |
| Flyback capicitors | Cf 1 | 5.6 nF | |
| | Cf2 | 5.6 nF | |
| | Cf3 | 15 nF | |
| Flyback diodes D4 | D1 and D4 | | BY328 BYR29F800 |
| main S-capacitor | C1 | 270 nF | |

The values of the components of the dynamic S-correction circuit as shown in FIG. 5 are in an embodiment of the invention:

R1 = 100 KOhms   R2 = 10 KOhms   R3 = 2.2 KOhms
C3 = 100 nF      R4 = 470 KOhms  D1 has a zener voltage of 4.7 V
C4 = 10 uF       R5 = 47 KOhms   R6 = 2.7 KOhms
C2 = 120 nF      C6 = 1 nF       R7 = 100 Ohms.

It should be noted that the above-mentioned embodiments illustrate rather than limit the invention, and that those skilled in the art will be able to design many alternative embodiments without departing from the scope of the appended claims. The dynamic S-correction in accordance with the invention is basically suited for all types of picture tubes used in TV as well as in CMT (color monitors) where these distortions occur. In case of CMT applications, a similar circuit is able to compensate both higher order linearity errors over a wide horizontal frequency range of e.g. 30 kHz to 40 kHz with the use of the existing multiple S-capacitor bank, combined with only one dynamic switched additional capacitor for the given frequency range.

In the claims, any reference signs placed between parentheses shall not be construed as limiting the claim. The word "comprising" does not exclude the presence of other elements or steps than those listed in a claim. The invention can be implemented by means of hardware comprising several distinct elements, and by means of a suitably programmed computer. In the device claim enumerating several means, several of these means can be embodied by one and the same item of hardware.

To summarize, the invention is concerned with a simple and cheap dynamic S-correction circuit which compensates the higher order errors like the so-called moustache effect and the inner linearity distortion. This is achieved in a known way by connecting an additional proper tuned S-capacitor in parallel with the original one during the start and end of the scan interval. Duty cycle modulation of the on/off times as a function of the frame position compensates the inner-pin distortion (also called inner-linearity or modulated S-correction). In accordance with the invention, the duty cycle or the switch on and off instants required to compensate the horizontal distortion or moustache effect is derived by comparing the AC parabolic waveform generated on the S-capacitors with a DC-voltage. Duty-cycle modulation required for compensation of the inner-pin distortion is, in this way, automatically obtained. This is so because the voltage across the S-capacitors is modulated by an East West parabola (in TV application) or by a V+ parabola (in Computer Monitor application) as a function of the frame position.

What is claimed is:

1. A line deflection circuit comprising: a first S-correction capacitor coupled to a line deflection coil, and a dynamic S-correction circuit which comprises:
   a switch and a second S-correction capacitor coupled to the first S-correction capacitor to alter the S-correction when the switch alters its state, and
   a control circuit for controlling the state of the switch to be on or off, characterized in that the control circuit comprises a comparator for comparing a voltage across the first S-correction capacitor with a reference level to alter the state of the switch when said voltage crosses the reference level, said voltage comprising a DC and an AC component.

2. A line deflection circuit as claimed in claim 1, characterized in that the dynamic S-correction circuit has only two terminals which are connected across the first S-correction capacitor.

3. A line deflection circuit as claimed in claim 1, characterized in that the control circuit comprises a circuit for combining a portion (k1) of said voltage with a portion (k2) of the AC-component of said voltage to obtain an input voltage for the comparator.

4. A line deflection circuit as claimed in claim 1, characterized in that the control circuit comprises a circuit for combining a portion (k1) of the DC-component of said voltage with a portion (k2) of the AC-component of said voltage to obtain an input voltage for the comparator.

5. A dynamic S-correction circuit comprising:
   a switch and a second S-correction capacitor coupled to a first S-correction capacitor of a line deflection circuit to alter the S-correction when the switch alters its state, and
   a control circuit for controlling the state of the switch to be on or off, characterized in that the control circuit comprises a comparator for comparing a voltage across the first S-correction capacitor with a reference level to alter the state of the switch when said voltage crosses the reference level, said voltage comprising a DC and an AC component.

6. A dynamic S-correction circuit as claimed in claim 5 further comprising;
   means for amplitude modulating an AC waveform developed across the first S-connection capacitor so as to control the state of said switch in a manner so as to compensate for any inner-pin distortion.

7. A dynamic S-correction circuit as claimed in claim 5 wherein the dynamic S-correction circuit has only two input terminals for connection across the first S-correction capacitor, said two input terminals providing the only operating voltage for the dynamic S-correction circuit.

8. A dynamic S-correction circuit as claimed in claim 5 wherein the control circuit comprises means for combining a portion of said voltage with a portion of the AC-component of said voltage to obtain an input voltage for the comparator.

9. A display apparatus comprising: an electron display tube and a line deflection circuit magnetically coupled thereto, the line deflection circuit comprising; a first S-correction capacitor coupled to a line deflection coil of the line deflection circuit, and a dynamic S-correction circuit which comprises:
   a switch and a second S-correction capacitor coupled to the first S-correction capacitor to alter the S-correction when the switch alters its state, and
   a control circuit for controlling the state of the switch to be on or off, characterized in that the control circuit comprises a comparator for comparing a voltage across the first S-correction capacitor with a reference level to alter the state of the switch when said voltage crosses the reference level, said voltage comprising a DC and an AC component.

10. A display apparatus as claimed in claim 9 wherein the dynamic S-correction circuit has two input terminals which are connected across the first S-correction capacitor and no other terminals for connection to a DC supply voltage.

11. A display apparatus as claimed in claim 9 wherein the control circuit comprises means for combining a portion of said voltage with a portion of the AC-component of said voltage to obtain an input voltage for the comparator.

12. A display apparatus as claimed in claim 9 wherein the line deflection circuit comprises:
   a line deflection coil connected in series circuit with the first S-correction capacitor, a further inductor and a further capacitor to a source of supply voltage, and
   east-west generator means for applying an east-west signal to the line deflection circuit so as to amplitude modulate a deflection current in the line deflection coil in a manner so as to compensate for any inner-pin distortion of the apparatus.

13. A line deflection circuit comprising:
   a line deflection coil coupled to a first switching transistor,
   a first S-correction capacitor coupled to the line deflection coil, and
   a dynamic S-correction circuit coupled to the first S-correction capacitor, wherein the dynamic S-correction circuit comprises;
      a second switching transistor coupled to a second S-correction capacitor, and
      a control circuit for controlling the ON-OFF state of the second switching transistor as a function of a voltage developed across the first S-correction capacitor and in a manner so as to alter the S-correction to compensate for any inner-pin distortion of a display apparatus including the line deflection circuit.

14. A line deflection circuit as claimed in claim 13 further comprising:
   means for controlling the switching state of the first switching transistor so as to develop a parabola shaped voltage waveform across the first S-correction capacitor, and
   the control circuit includes a diode in parallel with the second switching transistor.

15. A line deflection circuit as claimed in claim 13 further comprising:
   means for controlling the switching state of the first switching transistor so as to develop a voltage across the first S-correction capacitor having a DC and an AC component, and
   means for controlling the ratio between the AC component and the DC component thereby to obtain said compensation for said inner-pin distortion.

16. A line deflection circuit as claimed in claim 13 further comprising:
   means for amplitude modulating an AC waveform developed across the first S-correction capacitor so as to control the state of said second switching transistor to obtain said compensation for said inner-pin distortion.

17. A line deflection circuit as claimed in claim 13 further comprising:
   a diode connected in parallel with the second switching transistor and which begins to automatically conduct a current during the flyback period of the line deflection circuit, wherein the second switching transistor is switched on at the beginning and end of a line scan period so as to couple the second S-correction capacitor in parallel with the first S-correction capacitor, and the second switching transistor is switched off during the scan interval period so as to decouple the second S-correction capacitor from the first S-correction capacitor.

18. A line deflection circuit as claimed in claim 13 wherein a deflection current in the line deflection coil generates a parabola shaped voltage waveform across the first S-correction capacitor, the line deflection circuit further comprising;

means for modulating the deflection current as a function of frame position thereby to modulate the parabola shaped waveform across the first S-correction capacitor.

19. A line deflection circuit as claimed in claim 13 wherein the dynamic S-correction circuit has only two terminals which are connected across the first S-correction capacitor such that no further supply voltage is required for operation of the dynamic S-correction circuit.

20. A line deflection circuit as claimed in claim 13 wherein a deflection current in the line deflection coil generates a parabola shaped voltage waveform across the first S-correction capacitor, the parabola shaped voltage waveform having a DC component and an AC component, and the control circuit includes means for controlling the switching of the second switching transistor as a function of the parabola shaped voltage waveform across the first S-correction capacitor and a DC reference voltage.

21. A line deflection circuit as claimed in claim 13 wherein the control circuit controls the switching of the second transistor as a function solely of a parabola shaped voltage developed across the first S-correction capacitor.

* * * * *